US011803815B1

(12) United States Patent
Agarwal et al.

(10) Patent No.: US 11,803,815 B1
(45) Date of Patent: Oct. 31, 2023

(54) SYSTEM FOR THE COMPUTER MATCHING OF TARGETS USING MACHINE LEARNING

(71) Applicant: Vettery, Inc.

(72) Inventors: Bhavish Agarwal, Rani Bagh (IN); Abhishek Gupta, San Francisco, CA (US); Ye Xu, Foster City, CA (US)

(73) Assignee: Vettery, Inc., New York, NY (US)

( * ) Notice: Subject to any disclaimer, the term of this patent is extended or adjusted under 35 U.S.C. 154(b) by 858 days.

(21) Appl. No.: 16/047,739

(22) Filed: Jul. 27, 2018

(51) Int. Cl.
*G06Q 10/1053* (2023.01)
*G06N 20/00* (2019.01)
*G06F 16/335* (2019.01)
*G06F 18/21* (2023.01)

(52) U.S. Cl.
CPC ....... *G06Q 10/1053* (2013.01); *G06F 16/335* (2019.01); *G06F 18/21* (2023.01); *G06N 20/00* (2019.01)

(58) Field of Classification Search
CPC .. G06Q 10/1053; G06N 20/00; G06F 16/335; G06K 9/6217
USPC ........................................................ 705/321
See application file for complete search history.

(56) References Cited

U.S. PATENT DOCUMENTS

| | | | | |
|---|---|---|---|---|
| 2005/0114279 A1* | 5/2005 | Scarborough | ........ | G06Q 10/063 706/21 |
| 2011/0145161 A1* | 6/2011 | Scarborough | ...... | G06Q 10/0639 705/321 |
| 2014/0122355 A1* | 5/2014 | Hardtke | ............... | G06Q 10/105 705/321 |
| 2014/0358810 A1* | 12/2014 | Hardtke | ............... | G06Q 10/105 705/321 |
| 2017/0161366 A1* | 6/2017 | Maitra | ................ | G06F 16/3344 |
| 2018/0130024 A1* | 5/2018 | Fang | ..................... | G06N 20/00 |
| 2018/0240072 A1* | 8/2018 | Dey | ..................... | G06F 40/279 |
| 2019/0205838 A1* | 7/2019 | Fang | ................ | G06Q 10/06398 |

OTHER PUBLICATIONS

Louis Columbus, "Five Reasons Why Machine Learning Needs To Make Resumes Obsolete", May 13, 2018, https://softwarestrategiesblog.com/ (Year: 2018).*

* cited by examiner

*Primary Examiner* — Sangeeta Bahl
*Assistant Examiner* — Joshua D Schneider
(74) *Attorney, Agent, or Firm* — COOLEY LLP (57) ABSTRACT

The presently disclosed subject matter includes an apparatus with a processor and a memory storing code which, when executed by the processor, causes the processor to receive a data profile associated with a candidate resource, the data profile includes a set of attributes of the candidate resource which are relevant for assessing the candidate resource's suitability to satisfy a particular resource demand. The apparatus extracts an n-dimensional feature vector from the received data profile, the n-dimensional feature vector capturing aspects of the candidate resource's attributes and process said n-dimensional feature vector with a first ensemble machine learning model to generate a first suitability factor. Likewise, the apparatus process said n-dimensional feature vector with a second ensemble machine learning model to generate a second suitability factor. The apparatus determines whether to allocate the candidate resource to the particular resource demand using said first and second suitability factors.

20 Claims, 5 Drawing Sheets

FIG. 1

Candidate Feature Vector
201

Preferred Location: [San Francisco; New York City; Boston; Austin]

Software Engineering Experience: [HTML/CSS Engineer; JS Frontend Engineer; Python Engineer; Full Stack Engineer]

Skills: [JavaScript; Python; Golang; Java; Django; HTML; PHP; SQL; .NET; ASP.Net]

Preferred Salary: [$90,000]

Current location and market of candidate: ["lat": 31.9685988, "market_id": 11, "lng": -99.9018131, "name": "Winters, TX", "country_code": "US"]

Normalized Summary: ["Agile Software Development"],

•
•
•

Example of raw data included in a candidate profile
203

ABOUT EDGAR

Throughout my professional experiences, I have worked among various rising technology startups in Silicon Valley. I have collaborated with my colleagues in developing, implementing, and assessing unique technological projects through agile development for rapid deployment in disruptive markets. I have worked with various languages and frameworks throughout my career. Similarly, I have trained and assessed new and potential hires for my organizations.

Throughout my academic experiences, I have engaged in cross-disciplinary and cutting-edge research within the fields of computer science and international development. At MIT, I gained extensive knowledge and research experience within the fields of Computer Science and Engineering that have contributed to my critical and analytic reasoning. Beyond my courses, I also conducted research papers and reports with various research

SYSTEM FOR THE COMPUTER MATCHING OF TARGETS USING MACHINE LEARNING

TECHNICAL FIELD

The present disclosure relates generally to machine learning systems for use in matching candidate resources to varying demands for such resources and in one example, the machine learning system can be applied to the placement of job candidates in the labor market.

BACKGROUND

The classification of an entity is often based on mapping quantitative or qualitative properties of that entity with a standardized set of keywords and performance measures known to be associated with a targeted category. Some of these standard keywords and performance measures are indeed robust indicators of the targeted category however, these standardized sets at most provide one of many possible ways to classify entities and do not warranty an accurate classification. As data driven technologies become more ubiquitous information regarding entities becomes larger and relying on a particular set of keywords and performance measures to solve classification problems represents an obstacle to leverage such information.

Classification problems arise in different contexts. One context is the labor marketplace where employers try to find a match with an appropriate candidate employee while job seekers struggle to find an appropriate employer. A great number of job seekers submit their information to existing job matching systems with the expectation of finding a position matching their profiles and skills. These job matching systems however, admit job seekers information and the advertisement of jobs without taking into account the labor market demands for specific positions. These systems also do not curate or otherwise process job seekers information in ways to establish whether a job seeker is a candidate who is highly likely to receive job offers. The shortcomings of existing matching systems result in inefficiencies that cause missed opportunities and unfulfilled potential for employers and employees.

Thus, a need exists for systems that can adequately search a given marketplace to match candidate resources with market needs such as matching candidates with employers based on the analysis of the current labor market, implicit and explicit skills and experience of job seekers that goes beyond mapping standardize keywords and performance values to classify the suitability of job seekers with respect to job positions.

SUMMARY

The presently disclosed subject matter includes an apparatus with a processor and a memory storing code which, when executed by the processor, causes the processor to receive a data profile associated with a candidate resource, the data profile includes a set of attributes of the candidate resource which are relevant for assessing the candidate resource's suitability to satisfy a particular resource demand. The apparatus extracts an n-dimensional feature vector from the received data profile, the n-dimensional feature vector capturing aspects of the candidate resource's attributes and processes said n-dimensional feature vector with a first ensemble machine learning model to generate a first suitability factor. Likewise the apparatus processes said n-dimensional feature vector with a second ensemble machine learning model to generate a second suitability factor. The apparatus determines whether to allocate the candidate resource to the particular resource demand using said first and second suitability factors.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

A candidate-position matching (CPM) system based on a machine learning model is discussed below. The CPM system examines candidate profiles and assesses whether there are any potential matches of candidates with job positions based on characteristics of the labor market, including trends and seasonality. The CPM system learns from job positions available in the market (labor market demands) and adjusts the supply of candidates for those positions. Thus, in one aspect, the CPM system increases the likelihood that candidates will be selected by employers by curating candidate profiles into data structures with normalized formats consistent with the demands of the labor market. The process of curating candidate profiles can include the organization, collection, annotation, and other suitable types of operations performed on candidates' data such that, the data can be maintained over time, and remain ready to be used in other processes (e.g., classification processes discussed below). The curation of candidate profiles is automated such that, the time and information used to place candidates in the labor market is minimized and the matching of candidates with job positions is objective.

In one aspect, the CPM system identifies via machine learning models highly volatile and complex data patterns concealed from job seekers and employers. The CPM system uses the identified patterns to match job seekers objectively with optimal job positions circumventing human bias that often wise tampers with such a bias, a hiring processes. In another aspect, the CPM system determines a reliable minimal set of features or characteristics of job seekers and uses the minimal set of features to make robust predictions about the placement of job seekers in the labor market. In yet another aspect, the CPM system uses a dynamic classification criteria implemented via a hybrid approach that integrates historical data and current data to classify the suitability of a job seeker based on data patterns identified in information provided by job seekers and factors that correlate with exogenous variables that influence the labor market.

Figure 1:
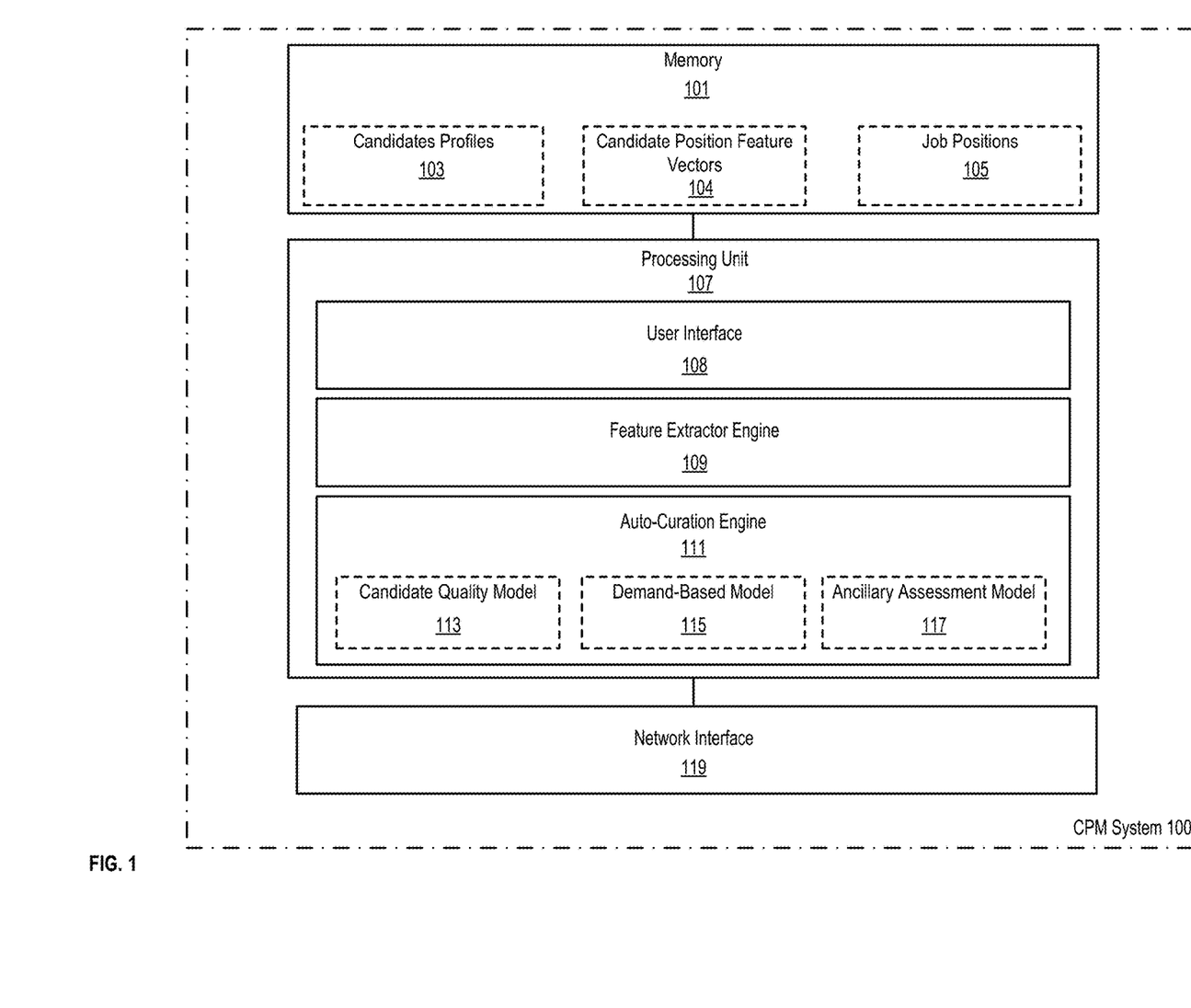
FIG. 1 is a block diagram illustrating a candidate position matching system, according to an embodiment.

FIG. 1, shows a block diagram illustrating components of CPM system according to one embodiment. The CPM system 100 includes at least one processing unit 107 including (or otherwise operatively connected to) one or more computer processors and computer memory 101 and network interface 119. Computer memory 101 can be implemented in, for example, a non-transitory computer readable medium configured with instructions to be executed by processing unit 101 to perform operations described below with reference to FIG. 3 and FIG. 4. According to one example, processing unit 107 can include or implement graphical user interface 108, feature extractor engine 109, and auto-curation engine 111.

In some implementations, candidate profiles 103 can be received via the user interface 108 or the network interface 119 and stored in a database or other suitable data structure implemented in the memory 101. Candidate profiles can include skills, preferred role or job position, employment history, education history, preferred location, expected salary and other suitable information of a candidate that can be used to match such candidate with a job position. Likewise, job positions can be received via the user interface 108 or network interface 119 stored in a database or other suitable data structure implemented in the memory 101. Job positions can include descriptions of jobs available in the market and information about the requirements to fulfill such jobs.

Feature extractor engine 109 retrieves candidate profiles from memory 101 and converts a given candidate profile into a candidate feature vector. A candidate feature vector is an n-dimensional data structure containing normalized values representing the information included in the candidate profiles. While a candidate can have a one-to-one relationship with a candidate feature vector, the candidate feature vector can have a one-to-many relationship (or matches) with job positions. An example of a candidate feature vector is discussed below with reference to FIG. 2. Likewise the feature extractor engine 109 receives job positions 105 and converts the job positions into a job position feature vectors 105. Candidate position feature vectors 104 are combination of candidate vectors and job position vectors that can be similarly produced by, for example the feature extractor engine 109.

The auto-curation engine 111 can receive as inputs one or more of the candidate feature vectors, the job position feature vectors and/or the candidate position feature vectors produced by the feature extractor engine 109 and outputs a judgement or classification indicating whether a candidate profile is approved or rejected for a job position along with a confidence value. Candidates who are likely to find some threshold interest from different employers (where interest is measured in one example by the number of interview requests the candidate receives) based on their profiles and the implicit and/or explicit demand for their skills; are deemed to be approved and their profiles are selected to be available to the employers. Candidates who are unlikely to find sufficient interest from different employers based on their profiles and demand for their skills are deemed to be rejected and their profiles are not made available to the employers.

In some instances, the auto-curation engine can approve any candidate for which it assesses that there is a great enough probability that they will receive 2 or more interview requests from different employers and rejects any candidate who is likely to receive fewer than 2 interview requests from different employers. It is appreciated the auto-curation engine 111 can be configured to operate with reference to a number of likely interview requests different from 2 (e.g., 1, 3, 4, 5 or other suitable amount). For instance, an output of the auto-curation engine 111 for a given candidate ("Jon Doe") with respect to one or more job positions can be produced as {judgement: approve; confidence: 0.82}. Such an output indicates that there is 82% probability that Jon Doe is going to receive, for instance, 2 or more interview requests. It is also appreciated that the auto-curation engine is configured to produce highly precise outputs via confidence values. For instance, judgements that fall below a particular confidence threshold can be marked as 'Not Sure' or "Unknown". For instance, if a candidate ("Jane Doe") gets the following judgement: {judgement: approve; confidence: 0.62} and the auto-curation engine is configured to operate with a confidence threshold is 0.7 then the final judgement for Jane Doe would be 'Not Sure' or 'Unknown'.

The auto-curation engine 111 implements candidate quality model 113, demand-based model 115, and ancillary assessment model 117 to execute one or more of the operations discussed above. At the backend the candidate quality model 113 implements a machine learning model that has been trained with a training set that includes records or profiles of candidates who have submitted their profile information to the CPM system and information about the number of interview requests such candidates received in a given period of time after submitting their profile information. The candidate quality model 113 receives candidate's profile information from the feature extractor engine 109 in a normalized data structure in the form of n-dimensional vectors. Such n-dimensional vectors contain normalized features of candidates. In some instances, the candidate quality model also receive information about the number of interview requests actually received by the candidates associated with the received candidate feature vectors. During the training phase, the candidate quality model 113 learns, from the received n-dimensional vectors, combinations of features that result in, for example, 2 or more interview requests and combinations of features that result in fewer than 2 interview requests. The system thereby develops the qualitative criteria for assessing candidate profiles as either likely or unlikely to receive a certain number of interview requests.

The trained version of the candidate quality model 113 can be tested with a set of testing profiles different from those used from in the training process. The testing set also includes records or profiles of the candidates who have previously submitted their information for matching. In the testing phase the measures of the number of interview requests such candidates actually received is not fed into the trained version of the candidate quality model. Instead the candidate quality model computes predictions on the number of interview requests expected to be received by each candidate with a candidate profile including in the testing set. The expected interview requests predicted by the candidate quality model 113 for each candidate profile included in the testing set are then compared to the actual interview requests received by each candidate to determine the precision or accuracy of the model.

In some implementations, the CPM system via the demand-based model 115 computes the explicit demand for a particular job position or job title for a period of time (e.g., 21 days). The demand-based model can likewise, determine an explicit demand for a candidate based on job positions posted by employers via the CPM system and other exogenous variables that influence the labor market including the current economic structure and the current structure of the labor force. Accordingly, the demand-based model 115 can determine the demand for a particular candidate given the candidate's profile (in the form of an n-dimensional feature vector) and computed demands from one or more job positions or job titles and other exogenous variables.

The CPM system also includes an ancillary assessment model which utilizes an acceptance criteria different from the candidate quality model 113 and the demand-based model 115. In some instances, the ancillary assessment model prevents the rejection of a candidate whose candidate profile might have been rejected by the candidate quality model and/or the demand-based model. Thus, in some instances, the ancillary assessment model 117 can approve a candidate even when such a candidate is rejected by the candidate quality model 113 and/or the demand-based model 115. Differently stated, the ancillary assessment model 117 can serve as a corrective model that prevents the rejection of a candidate when, based on other tacit criteria (different from the criteria used in model 113 and model 115), such candidate has a significant probability of receiving interview requests.

For example, the ancillary assessment model 117 can approve a candidate based on tacit criteria including whether such candidate has worked in "high quality companies" or graduated from an educational institution such as a college, or a graduate program, that is considered highly reputable or noteworthy or other similar criteria not explicitly considered by the candidate quality model 113 and/or the demand-based model 115. Thus, in some instances, the ancillary assessment model 117 can identify candidates based on such tacit criteria and override an auto-rejection decision made by model 113 and/or model 115 to instead, "Approve" such candidates.

In some other implementations, the ancillary assessment model 117 can further approve a candidate based on certain skills and/or previous job positions held by the candidate, skills and/or positions for which the candidate quality model 113 and/or demand-based model 115 have not developed an assessment criteria. For instance, some unique candidates can have desirable skills and/or work experience that are scarce or for which there not sufficient historical data available to train a machine learning model. Accordingly, in some embodiments, the ancillary assessment model 117 can implement a set of heuristic rules that prevent auto-rejection of candidates who possess unique and desirable skills or work experience that are so uncommon that a fair or justified assessment (or prediction) cannot be rendered with a sufficient confidence level.

The CPM system 100 can communicate to other compute devices in a network, for instance client compute devices in a network (not shown in FIG. 1) via network interface 119. For example the CPM system can be connected to computer networks including any one of: the Internet, Local Area Network (LAN), Wide Area Network (WAN), Metropolitan Area Network (MAN), or mobile networks, or any combination thereof. Computers within the computer network can communicate with the CPM system through any suitable connection (including wired or wireless) and communication technology or standard.

Figure 2:
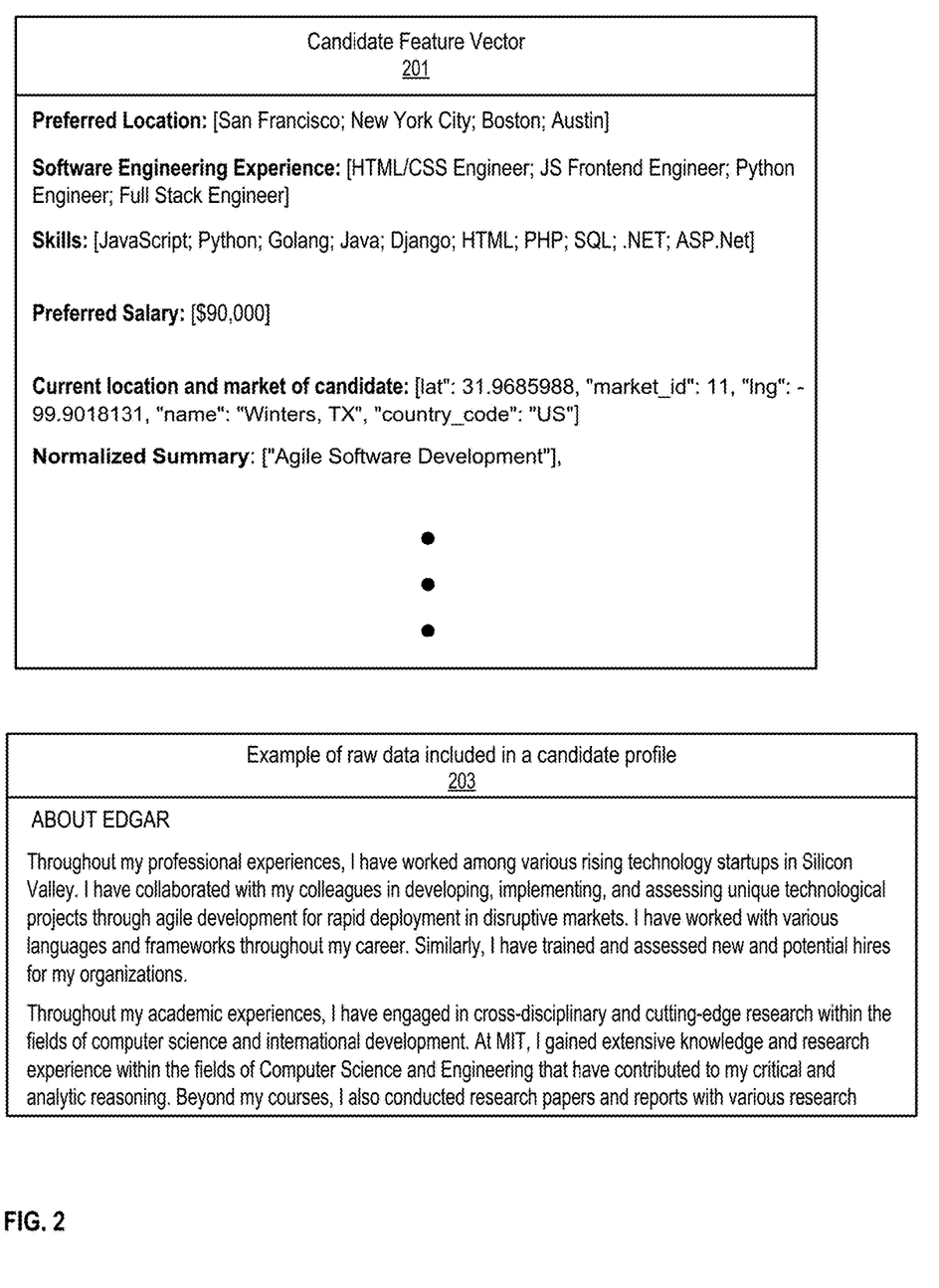
FIG. 2 is an example of a candidate feature vector, according to an embodiment.

FIG. 2 is an example of a candidate feature vector, according to an embodiment. As discussed above, the CPM system 100 can receive information about a candidate via a user interface or from a client compute device connected to the network interface of the CPM system. The feature extractor engine 109 (FIG. 1) uses the candidate information to produce a candidate feature vector 201 such as the one shown in FIG. 2. A candidate feature vector is a data structure with a set of fields describing characteristics of a job seeker or candidate. In some instances attributes have one value for example the attribute "Preferred Salary" has a value of $90,000 while other attributes like "Preferred Location" can have more than one value (e.g., San Francisco, New York City, Boston, and Austin). In some instances, the value or values assigned to an attribute are not explicitly entered or selected by a candidate instead, the feature extractor engine 109 parses the candidate information, and then infers and/or extracts a value. For example, the value of the field "Normalized Summary" corresponding to Agile Software Development can be extracted from raw data included in a candidate's summary section shown at 203 of a candidate profile. For another example, values included in the field "Skills" can be likewise extracted from job descriptions previously held by a candidate.

It is understood that the attributes, values, and examples of candidate information illustrated in FIG. 2 are non-limiting examples. A candidate feature vector can likewise contain other data explicitly or implicitly included in a candidate profile such as candidate's experience, employment history, educational background, whether or not a candidate is authorized to work in a given country, types of employment previously held by a candidate, companies for which the candidate has previously worked and other suitable candidate related data.

Figure 3:
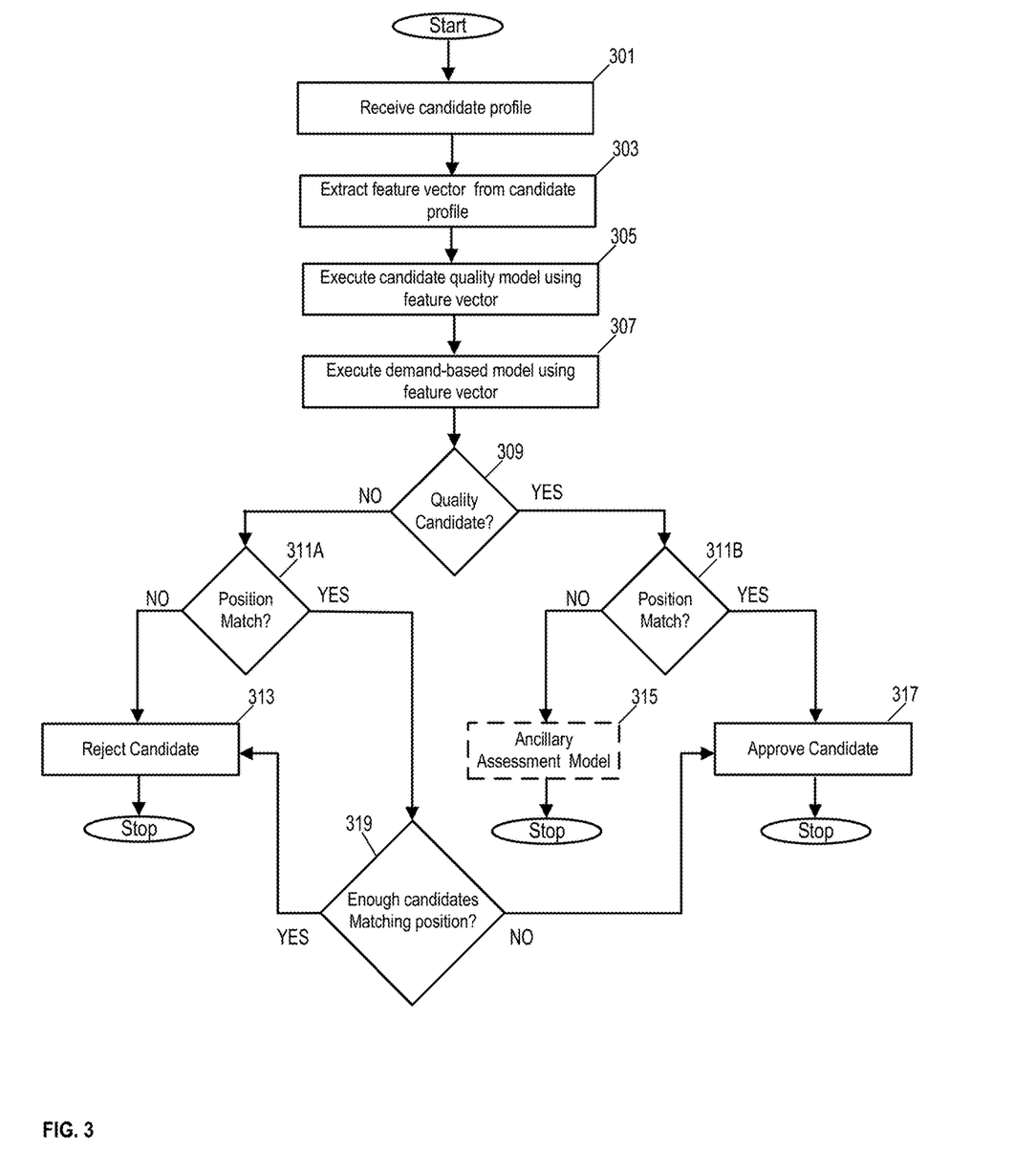
FIG. 3 is a flowchart illustrating a process to match a candidate with one or more job positions which can be executed by the candidate position matching system, according to an embodiment.

FIG. 3 is a flow diagram that illustrates an example of a process executed by CPM system 100 discussed with reference to FIG. 1. The process starts by receiving a candidate profile at 301. A candidate profile can be received from, for example, a user in communication with a client compute device connected to the CPM system 100 (shown in FIG. 1). For instance, a candidate (or candidate representative) can be presented with an electronic form with a series of questions via the user interface 108 (shown in FIG. 1) or at a client compute device coupled to the CPM system 100. Thereafter, at 303 the CPM system 100 via, for example, feature extractor engine 109 discussed with reference to FIG. 1 can extract or produce a candidate feature vector at 303 from the received candidate profile.

The CPM system 100 executes at 305 via the auto-curation engine 111 the candidate quality model 113 and at 307 executes the demand-based model 115 using the candidate feature vector as input. At the conditional statement 309 the CPM system determines whether the quality model indicates that the candidate is a "quality candidate" with a confidence value greater than a predetermined threshold. A candidate is considered a "quality candidate" when such a candidate is associated with a candidate feature vector with at least a minimal number of attribute values that historically have been considered attractive to employers. More specifically, a "quality candidate" is a candidate with a set of skills and/or experiences proven to result in a certain number of interview requests with a sufficient level of confidence. In some instances, when the candidate is predicted to be a "quality candidate," then the flow continues at the conditional branch 311B where it is determined if there are matching job positions for such a candidate. In some instances, when there are matching job positions for the candidate, then the candidate's profile is approved at 317 and the flow stops. In some other instances, when there are no matching job positions for a "quality candidate" the flow can continue at 315 where the ancillary assessment model 117 is executed and the candidate profile can be further inspected or processed to determine if, for example, the candidate can be matched with a position based on other criteria not learned by the quality model and/or the position model.

In some instances when a candidate is predicted not to be a "quality candidate," then the flow continues at conditional statement 311A where is determined if there are matching job positions for such candidate. In some arrangements, when there are no matching positions for the candidate, the candidate is rejected at 313 and the flow stops. In this arrangement, when there are matching positions for the candidate the flow continues to conditional statement 319 where it is determined if there are already enough candidates (e.g., greater than a predetermined threshold) matching the position(s) matched at 311A. When there are enough candidates matching the position(s) matched at 311A then the candidate is rejected at 313 and the flow stops. If however, there are not enough candidates matching the position(s) matched with the candidate at 311A, then the candidate is approved at 317 and the flow stops with respect to that profile.

It is appreciated that via the process described above, the CPM system captures real-time labor market demands in a quantitative manner at least based on the job positions posted by employers. The CPM system can capture short term labor market trends by, for example, determining the number of candidates matching a specific type of job position open in the market place e.g., Software Engineer. In some instances, if the ratio between the number of unfulfilled Software Engineer positions and the number of candidates predicted to be "quality candidates" to occupy such unfulfilled Software Engineer positions indicates a surplus of "quality candidates" interested in Software Engineer jobs then, the CPM system can further examine "quality candidates" via the ancillary assessment model to determine whether such candidates can be equally predicted to be "quality candidates" for other job positions different from Software Engineer. Thus, the predictions rendered by the CPM system can be at least in part controlled based on trends of the labor market while preserving the validity of the confidence level of the predicted factors or classifications. Moreover, the CPM system can capture subtle changes in the demand for employees and adjust the supply of candidates accordingly making it an optimal solution for the placement of jobs in both highly liquid labor markets and other less liquid markets.

An aspect of the disclosed CPM system is that matching techniques can take into account implicit demand signals such those included in trends of the marketplace, and explicit demand signals as described below. One of the discernable patterns of any mature and stable market is the long term trend of the demand in that market. For example, Ruby Engineers have been in demand in San Francisco for a significant time and this can be considered a stable trend. Likewise, successful placement of candidates having prior job experience in companies with long lasting reputations can be equally considered to be part a stable trend. Such stable trends can be thought of as defining, at least in part, an implicit demand signal. In other words, the trends in a mature marketplace can be largely captured as implicit demand signals. By looking at the historical pattern of successful vs unsuccessful candidates a machine learning system can predict what 'kind' of candidates are more likely to do well on the labor market without really knowing their quantitative demand.

The specific machine learning techniques discussed below make reference to models based on decision trees however, other supervised classification machine learning techniques can be equally used to implement the models discuss below.

Figure 4:
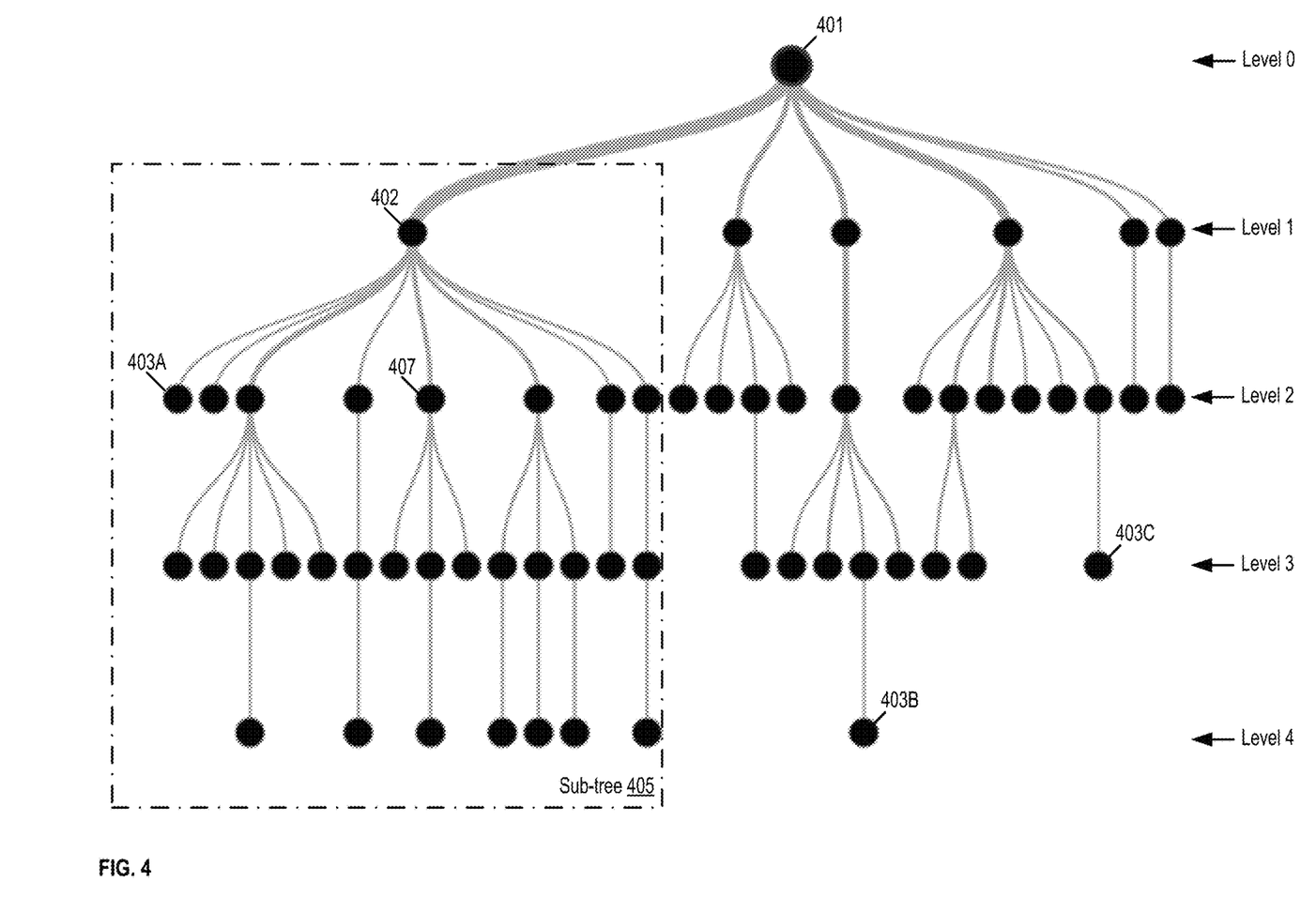
FIG. 4 is an example of an ensemble model including multiple independent classifiers, according to an embodiment.

FIG. 4 is an example of an ensemble model including multiple independent classifiers, according to an embodiment. In some implementations, the candidate quality model 113, the demand-based model 115, and the ancillary assessment model 117 (shown in FIG. 1) can be implemented via ensembles of classification and regression trees also referred to herein as decision tree ensembles. A decision tree ensemble is a type of predictive machine learning model used for classification or regression predictive modeling problems. A decision tree ensemble can be implemented as a directional graph of N number of levels like the one shown in FIG. 4. Although the decision tree shown in FIG. 4 includes five levels, it is understood that a decision tree ensemble can be implemented to have multiple levels.

At the top of the decision tree (i.e., at level 0) is the root node 401 which extends via different branches to multiple leaf nodes. Leaf nodes such as 403A, 403B, and 403C represent classification categories assigned to a candidate or job seeker. Branches in an ensemble of decision trees can include multiple intermediate nodes, these are nodes that are not the root node or a leaf node (e.g., node 402 and node 407). Each intermediate node represents a decision or question used to classify a candidate or job seeker. Intermediate nodes split or partition a decision trees into subsets that contain instances with similar values that is into more similar or homogenous categories.

Intermediate nodes are determined during the training phase of the ensemble of decision trees. Because it is desirable to determine which attributes of a job seeker are the most useful to discern between job seekers likely to receive an interview request and those who are not, during training phase it is quantified how much information an attribute of a job seeker carries, this is also known as information gain. Information gain is also useful to identify in what combination of attributes and how much weight should be given to such attributes to evaluate different candidates interested in similar job positions. Although a set used in the evaluation of two different candidates may be distinct the CPM system is objective in the sense that only those candidates that are classified to be, for example "quality candidates" with a confidence level that reaches a predetermined threshold are eligible to be approved by the CPM system. Differently stated, there may be multiple ways to be approved by the system and each way can result in an approval outcome with the same confidence value. For instance, a candidate who has graduated from an academic institution considered to be highly reputable can be approved for a job position by successfully traversing the criteria or nodes in the sub-tree 405 while another candidate who has graduated from an academic institution considered less reputable can be equally approved for the same job position by traversing the criteria included in the nodes of another sub-tree, different from the sub-tree 405.

Intermediate nodes are configured to represent attributes identified by the CPM system to be the strongest predictors or factors. While traversing the ensemble of decision trees a group of candidates sharing a certain attribute can end up in a same node, for example, node 402. Node 402 splits into eight nodes at level 2. Candidates from the group of candidates that were previously placed at node 402 can be further divided based on other attributes among the eight nodes (children nodes) of node 402 (parent node). An intermediate node is split into one or more nodes when the children nodes derived from that intermediate node decrease the relative entropy (i.e., increase homogeneity or similarity) of the sub-groups of candidates placed in the children nodes. The degree of randomness of a group of candidates can be given as function of the probability of such items as:

$$H=\Sigma_{i=1}^{n} P(x_i) \log_b P(x_i) \quad (1)$$

where P(x) is the probability of an item x (e.g., attribute value=x) and b is the base of the logarithm. Then the change in entropy, or information gain, is defined as:

$$\Delta H = H - \frac{m_L}{m} H_L - \frac{m_R}{m} H_R \quad (2)$$

Where m is the total number of instances, with $m_k$ instances belonging to class k, where K=1 . . . , k. Differently stated, information gain can be defined as the entropy of a parent node minus a weighted average of the entropy of each possible child node (each feature or attribute). Thus, the feature or attribute with the highest information gain is selected to produce children nodes. It is understood that other techniques can be analogously used including gain ratio, a measure of statistical dispersion (e.g., Gini index), or other suitable measure to determine homogeneity or impurity of a group of samples. Moreover, when the similarity between the groups of candidates cannot be further increased, that is when there is an insignificant entropy among the candidates placed in a node, the node stops producing children and the node becomes a leaf node. This feature, warranties that classifications can be predicted with a minimal set of features which reduces the number of computations required to classify candidates.

As discussed above, candidate quality model 113, demand-based model 115, and ancillary assessment model 117 can implement one or more decision trees. Accordingly, such trained decision trees can receive as input a candidate feature vector and then based on the data included in the candidate feature vector, can classify a candidate into one of the two categories: Approved or Rejected. As discussed above, in one instantiation, an Approved candidate is a candidate with a strong likelihood of getting at least 2 interview requests and a Rejected candidate is a candidate with a strong likelihood of getting one or no interview requests at all.

The models 113, 115 and 117 (shown in FIG. 1) can be developed using a candidate dataset collected from candidate profiles over a sufficiently long period of time, for example during 4 months that capture a large enough number of candidate profiles and associated acceptance/rejection information. In a dataset with candidate profiles collected for at least one role or position, profiles are labeled as "Approved" or "Rejected" depending on the number of interview requests received by the corresponding candidate. Examples of roles or positions include Software Engineering, Data Science, Product Manager Design, and other suitable technical and non-technical positions. Candidates who got 2 or more interview requests during the 4 month period are labeled as "Approved" while candidates who got fewer than 2 interview requests during the 4 month period are labeled as "Rejected."

The collected candidate dataset can be divided into a training dataset and a testing dataset. The training dataset can include the first 3 months of data from the captured 4 months of data and the testing dataset can include the last one-month of data from the captured 4 months of data. Other divisions or partitions of the dataset can be used.

One or more of the candidate quality model 113, demand-based model 115, and ancillary assessment model 117 can be implemented via ensemble models. An ensemble model is a collection of multiple decision trees that can perform better than a single decision tree because they are less sensitive to outliers often included in decision trees via datasets used during the training and testing of the decision tree. Thus, ensembles can mitigate the risk of overfitting a trained model (that is training a model that is only accurate rendering predictive factors for the samples used in the training but not for other samples) and can achieve better generalization at the time of categorizing unseen samples e.g., candidates with combinations of features and characteristics not included in the datasets used for training and/or testing.

Decision trees in an ensemble model are generated via tree sampling, that is a sampling process applied to a dataset (e.g., the training dataset) to build N number of decision trees in an ensemble model. In some implementations, sampling of the training dataset can be applied multiple times to a whole dataset depending on the number of decision trees conceived to be included in the ensemble model.

Multiple tree sampling techniques can be applied to generate the decision trees included in an ensemble model including sample rate, sampling type, replacements and other suitable techniques. The sampling rate is the percentage of instances being extracted from the training dataset and included in each sample extracted to generate a tree. Tree sampling type can be either random or deterministic. When using deterministic sampling the same seed value is used to generate samples producing repeatable results as opposed to random. Tree sampling with replacement allows a single instance to be selected multiple times in the generation of an ensemble model while sampling without replacement ensures that each instance is selected exactly once.

In some instances, when it is not desired to use all the instances available in a training dataset, sampling techniques can be analogously applied. Specifically, these techniques can be used to specify whether all the instances in a dataset should be used in the generation of ensemble models and/or how these instances are used. Such techniques include specifying a range or linear subset of instances to include in the sample. If the full range is not selected, then the sample rate is applied over a specified range. Out-of-bag sampling techniques can be used to include in a sample only those instances that were not selected in the first place (e.g., via a deterministic or a random process), thus effectively inverting the sampling outcome. As discussed above with respect to tree sampling other techniques that can be analogously used in dataset sampling include sample rate, sample type, replacement and other suitable sampling techniques.

In some implementations one or more ordering techniques can be executed over a dataset to accelerate the training process of an ensemble model. Such ordering techniques include linear, deterministic, and random order. In a linear ordering the instances from the dataset are not shuffled prior to modeling. This technique is recommended if the dataset is already in random order as the processing will be faster. In a deterministic order the instances from the dataset are shuffled deterministically and is recommended when a dataset is sorted and repeatability is required. In a random order, the instances from the dataset are shuffled randomly or non-deterministically.

Weighting techniques are used when a dataset is unbalanced, that is, some categories are common in the dataset while other categories are rare. To mitigate such unbalances one or more weighting techniques can be applied. For instance, a balance objective technique can be used to assign a higher weight to less frequent classes. Other suitable weighting techniques can be equally used to reach a balance between scarce and abundant instances.

In some implementations, decision trees in an ensemble can be generated according to different tree configurations or conditions. For instance, a modeling decision can include whether to explicitly include missing field values when choosing a split while growing a model. An additional modeling decision can include setting a soft limit for the number of nodes in a decision tree. When such number of computed nodes is greater than this threshold, the model growth is halted because nodes can be computed in batches, the final number of nodes can be greater than node threshold. A further modeling decision can include whether to consider only a random subset of possible fields at each split of a decision tree of an ensemble. Thus, decision trees in an ensemble can be built or generated according to the above conditions and configurations or other suitable techniques.

An example of a model to classify a candidate with respect to a software engineering position is discussed with reference to FIG. 5. As discussed above, a candidate feature vector can be extracted from a candidate profile via, for example, feature extractor engine 109 (discussed with reference to FIG. 1). Table 1 describes an example of the fields and data types included in a feature vector extracted from a candidate profile for a software engineer position.

TABLE 1

| Software Engineer Feature Vector | |
|---|---|
| Preferred Salary | Integer |
| Current position/job title | String |
| Sub Role_ID present or not | Boolean |
| Place ID | List |
| Common skills to Sub Role_Id mapping with count | Integer |
| Uncommon skills to Sub Role_ID mapping with count | Integer |
| If pedigree Employer | Boolean |
| If pedigree University | Boolean |
| Total experience calculated from year of graduation | Integer |
| Work authorization | Boolean |

Figure 5:
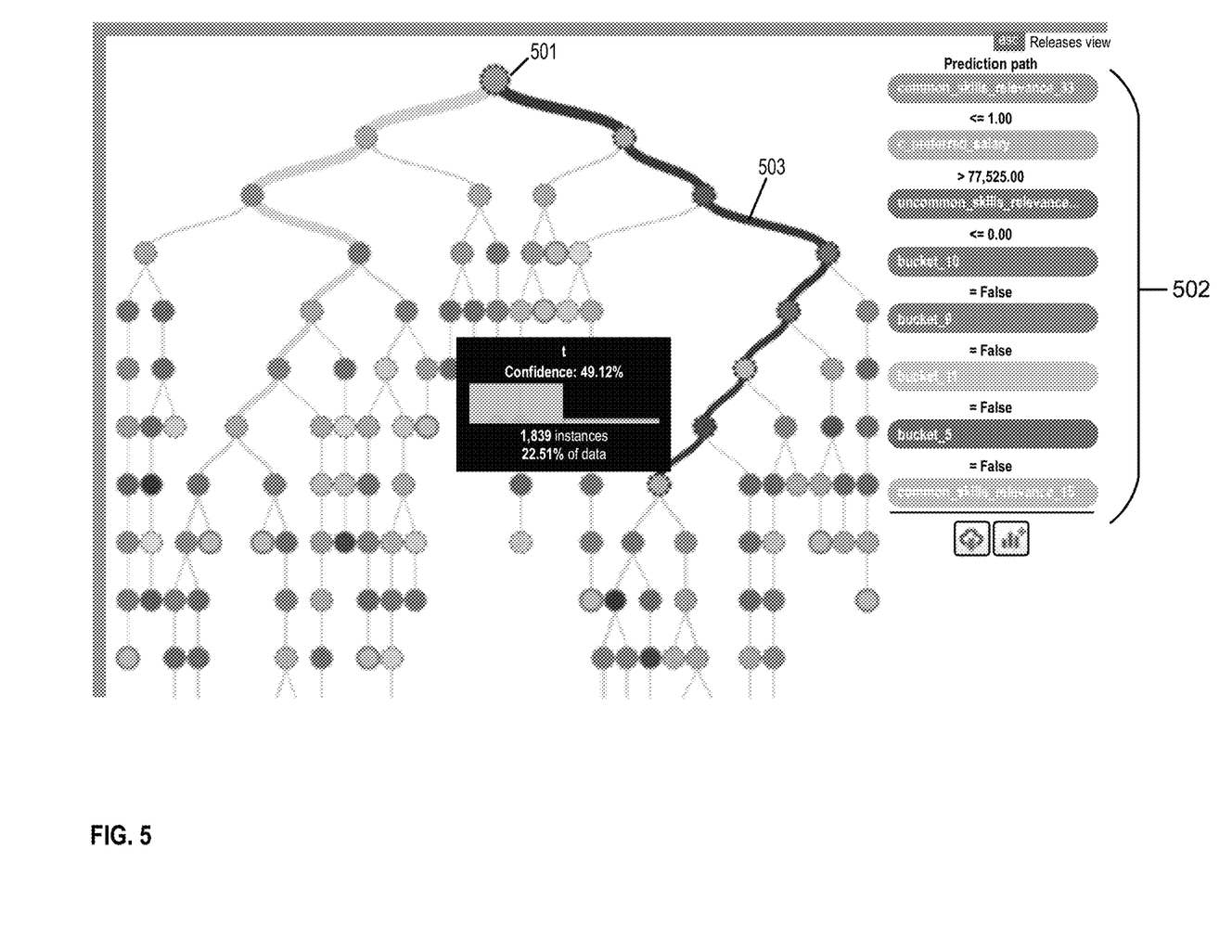
FIG. 5 is an example of an ensemble model to match a candidate with a job position, according to an embodiment.

In some implementations, a feature vector as the one described in Table 1 is input to the ensemble model shown in FIG. 5. Differently stated, the feature vector of the candidate who is to be classified as "Approved" or "Rejected" is walked through the decision tree through the path 501. At the root node 501 it can be determined whether the job seeker has indicated an interest in a particular job position e.g., Software Engineer. If such candidate has not indicated an interest with respect to the job position then the search stops and the output can be, for example, unknown or undetermined. If the candidate, however, has indicated interest in that particular job position then the ensemble of decision trees is traversed through the path 503. The path 503 is described at 502 where it is shown the attribute values of a candidate feature vector that lead through the nodes included in the path 503.

In some instances, candidates who applied for a position via the CPM system and got rejected can be contacted by the CPM system via a text message, an email, a telephone call or other suitable type of communication if, for example, the labor marketplace or other circumstances that lead to the rejection of the candidate change. Accordingly, the CPM system can reactivate a candidate profile when, for example, the demand to fulfill a job position for which a previously rejected candidate is a match increases. In such a case, the CPM system can re-evaluate candidate profiles corresponding to candidates that were previously rejected for their relevancy with respect to the current labor marketplace. For example, the candidate profiles that were previously approved by the model but however were rejected because of lack of demand can be automatically reactivated by the CPM system.

In some implementations, the CPM system can also provide a level of transparency to candidates by providing candidates with a reasoning used by the CPM system to for example, approve or reject their profiles. For example, a candidate interested in a software engineer position in Salt Lake City could be rejected because of lack of demand in the labor market in such a city. Thus, the CPM system can send an electronic communication (e.g., a prompted message) to the candidate recommending to explore different geographical locations where the candidate profile is on demand. Likewise, when a candidate profile is rejected for other reasons different from the demand of a position in a selected geographical location, the CPM system can provide candidates with feedback on why the candidate profile has been rejected, for example, when the candidate profile does not fulfill the minimum requirements for a position that is currently on demand as required by the labor market. (e.g., the candidate does not have a registration, license, or certificate stipulated as a minimum requirement for a job position currently in demand). Thus, once rejected by the CPM system candidates can take further informed actions to improve their profiles to become more competitive in the current marketplace.

In some implementations, the CPM system can provide other type of recommendations to rejected candidates beyond recommendations to improve their candidate profiles. For instance, if a candidate is interested in landing a job as a software engineer in a competitive and mature labor market e.g., San Francisco or the Bay Area, the candidate's opportunities to land such a job can be minimized due to the great supply of software engineers already applying for such jobs in the desired area. Thus, the CPM system can determine other geographical areas (e.g., Dallas) in which the candidate can land a software engineering job with a higher probability than the desired geographical area because, for example, the supply of qualified candidates in the recommended area is less than in the desired area. Likewise, the CPM system can make recommendations to candidates regarding job positions that are on demand in a desired geographical area that have less supply than the desired job position. For instance, a candidate interested in landing a job as a software engineer in a desired geographical area could have very few opportunities to land such a job because the supply of qualified candidates for the desired job position in the desired geographical area is great. However, the CPM system can determine based on the candidate profile, that such a candidate is also a good match for other job positions in the desired area different from a software engineer that may have a less supply of candidates. Thus, the CPM system can, for example, recommend to the candidate to apply to a user experience engineer position, a software quality assurance position or other job position for which the candidate is a good match available in the desired geographical area. Likewise, the CPM system can recommend to employees to consider candidates that were not predicted to qualified for an offered position based on the predicted factors provided by the quality candidate model and the demand based model but however, were qualified by the ancillary model. In such a case the CPM system can provide employees with reasons used by the ancillary model to determine that the candidate is worthy of consideration.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Processor-executable instructions can be in many forms, such as program modules, executed by one or more compute devices, and can include routines, programs, objects, components, data structures, and other suitable code that causes a processor to perform particular tasks or implement particular data types, and the functionality can be combined and/or distributed as appropriate for various embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The invention claimed is:

1. An apparatus, comprising:
   a processor; and
   a memory storing code which, when executed by the processor, causes the processor to:
   train a plurality of machine learning models based on a plurality of job seeker profiles, each job seeker profile in the plurality of job seeker profiles labeled with at least one factor value from a plurality of factor values;
   receive a job seeker profile not included in the plurality of job seeker profiles;
   predict, via a first machine learning model of the plurality of machine learning models, a first factor value of the plurality of factor values for the job seeker profile and associated with a confidence for expected interview requests for a job seeker associated with the job seeker profile, based on a set of features extracted from the job seeker profile;
   predict, via a second machine learning model of the plurality of machine learning models, a second factor value from the plurality of factor values for the job seeker profile and associated with a demand for the job seeker profile, based on the set of features extracted from the job seeker profile and a job position; and
   enable a communication between a set of computing devices of a set of employers associated with the job position and a computing device of the set of computing devices of the job seeker associated with the job seeker profile based on at least one of (1) the first factor value having a confidence indicator above a first predetermined threshold associated with the confidence for expected interview requests for the job seeker or (2) the second factor value having a demand indicator above a second predetermined threshold associated with the demand for the job seeker profile when the first factor value is below the first predetermined threshold.

2. The apparatus of claim 1, wherein:
   the plurality of machine learning models includes a set of decision trees,
   the set of features is a first set of features, and
   the code to cause the processor to train the plurality of machine learning models includes the code to cause the processor to generate each decision tree from the set of decision trees based on a similarity function applied on a second set of features extracted from the plurality of job seeker profiles.

3. The apparatus of claim 1, wherein the memory storing code which, when executed by the processor, further causes the processor to:
   send a message to the set of computing devices of the set of employers with information about the job seeker profile before the communication between the set of computing devices of the set of employers and the computing device of the job seeker is enabled.

4. The apparatus of claim 1, wherein:
   the job position is a first job position, and
   the memory storing code which, when executed by the processor, further causes the processor to:

predict, based on the set of features and a third machine learning model of the plurality of machine learning models, a suitability of the job seeker profile with respect to a second job position different from the first job position when the first factor value having the confidence indicator less than the first predetermined threshold and the second factor value having the demand indicator less than the second predetermined threshold; and send a message to the computing device of the job seeker indicating the suitability of the job seeker profile with respect to the second job position based on a third factor value of the plurality of factor values, the third factor value associated with a criteria different from the confidence associated with the first factor value and different from the demand associated with the second factor value, the third factor value having a corrective indicator greater than a third predetermined threshold different from the first predetermined threshold and the second predetermined threshold.

5. The apparatus of claim 1, wherein:
the first factor value indicates an acceptance or rejection of the job seeker with respect to the job position.

6. The apparatus of claim 1, wherein:
the plurality of machine learning models includes a set of decision trees trained with historical data of the plurality of job seeker profiles received from a set of job seekers and the set of employers regarding multiple job positions.

7. The apparatus of claim 1, wherein the memory storing code which, when executed by the processor, further causes the processor to:

send a communication to the computing device associated with the job seeker indicating a rejection based on the second factor value being lower than the second predetermined threshold;

automatically reactivate, after sending the communication, the job seeker profile for the job seeker in response an increase in demand for the job position;

predict, via the second machine learning model, a new second factor value based on the set of features and the increase in demand for the job position; and automatically reevaluate the job seeker profile based on the new second factor value.

8. A method, comprising:
training a plurality of machine learning models based on a plurality of job seeker profiles, each job seeker profile in the plurality of job seeker profiles labeled with at least one factor value from a plurality of factor values;

receiving a job seeker profile not included in the plurality of job seeker profiles;

predicting, via a first machine learning model of the plurality of machine learning models, a first factor value of the plurality of factor values for the job seeker profile and associated with a confidence for expected interview requests for a job seeker associated with the job seeker profile, based on a set of features extracted from the job seeker profile;

predicting, via a second machine learning model of the plurality of machine learning models, a second factor value from the plurality of factor values for the job seeker profile and associated with a demand for the job seeker profile, based on the set of features extracted from the job seeker profile and a job position; and enabling a communication between a set of computing devices of a set of employers associated with the job position and a computing device of the job seeker associated with the job seeker profile based on at least one of (1) the first factor value having a confidence indicator above a first predetermined threshold associated with the confidence for expected interview requests for the job seeker or (2) the second factor value having a demand indicator above a second predetermined threshold associated with the demand for the job seeker profile when the first factor value is below the first predetermined threshold.

9. The method of claim 8, wherein:
the plurality of machine learning models includes a set of decision trees,
the set of features is a first set of features, and
the method further includes generating each decision tree from the set of decision trees based on a similarity function applied on a second set of features extracted from the plurality of job seeker profiles.

10. The method of claim 8, further comprising:
sending a message to the set of computing devices of the set of employers with information about the job seeker profile before the communication between the set of computing devices of the set of employers and the computing device of the job seeker is enabled.

11. The method of claim 8, wherein:
the job position is a first job position, and
the method further includes:
predicting, based on the set of features and a third machine learning model of the plurality of machine learning models, a suitability of the job seeker profile with respect to a second job position different from the first job position when the first factor value having the confidence indicator less than the first predetermined threshold and the second factor value having the demand indicator less than the second predetermined threshold; and sending a message to the computing device of the job seeker indicating the suitability of the job seeker profile with respect to the second job position based on a third factor value of the plurality of factor values, the third factor value associated with a criteria different from the confidence associated with the first factor value and different from the demand associated with the second factor value, the third factor value having a corrective indicator greater than a third predetermined threshold different from the first predetermined threshold and the second predetermined threshold.

12. The method of claim 8, wherein:
the first factor value indicates an acceptance or rejection of the job seeker with respect to the job position.

13. The method of claim 8, wherein:
the plurality of machine learning models includes a set of decision trees trained with historical data of the plurality of job seeker profiles received from a set of job seekers and the set of employers regarding multiple job positions.

14. The method of claim 8, wherein the method further includes:
sending a communication to the computing device associated with the job seeker indicating a rejection based on the second factor value being lower than the second predetermined threshold;

automatically reactivating, after sending the communication, the job seeker profile for the job seeker in response an increase in demand for the job position;

predicting, via the second machine learning model, a new second factor value based on the set of features and the increase in demand for the job position; and automatically reevaluating the job seeker profile based on the new second factor value.

15. A processor-readable non-transitory medium storing code representing instructions to be executed by a processor, the code comprising code to cause the processor to:

train a plurality of machine learning models based on a plurality of job seeker profiles, each job seeker profile in the plurality of job seeker profiles labeled with at least one factor value from a plurality of factor values;

receive a job seeker profile not included in the plurality of job seeker profiles;

predict, via a first machine learning model of the plurality of machine learning models, a first factor value of the plurality of factor values for the job seeker profile and associated with a confidence for expected interview requests for a job seeker associated with the job seeker profile, based on a set of features extracted from the job seeker profile;

predict, via a second machine learning model of the plurality of machine learning models, a second factor value from the plurality of factor values for the job seeker profile and associated with a demand for the job seeker profile, based on the set of features extracted from the job seeker profile and a job position; and enable a communication between a set of computing devices of a set of employers associated with the job position and a computing device of the job seeker associated with the job seeker profile based on at least one of (1) the first factor value having a confidence indicator above a first predetermined threshold associated with the confidence for expected interview requests for the job seeker or (2) the second factor value having a demand indicator above a second predetermined threshold associated with the demand for the job seeker profile when the first factor value is below the first predetermined threshold.

16. The processor-readable non-transitory medium of claim 15, further comprising:

code to cause the processor to send a message to the set of computing devices of the set of employers with information about the job seeker profile before the communication between the set of computing devices of the set of employers and the computing device of the job seeker is enabled.

17. The processor-readable non-transitory medium of claim 15, wherein:

the job position is a first job position, and the memory storing code which, when executed by the processor, further causes the processor to:

predict, based on the set of features and a third machine learning model of the plurality of machine learning models, a suitability of the job seeker profile with respect to a second job position different from the first job position when the first factor value having the confidence indicator less than the first predetermined threshold and the second factor value having the demand indicator less than the second predetermined threshold; and send a message to the computing device of the job seeker indicating the suitability of the job seeker profile with respect to the second job position based on a third factor value of the plurality of factor values, the third factor value associated with a criteria different from the confidence associated with the first factor value and different from the demand associated with the second factor value, the third factor value having a corrective indicator greater than a third predetermined threshold different from the first predetermined threshold and the second predetermined threshold.

18. The apparatus of claim 1, wherein:

the memory storing code which, when executed by the processor, further causes the processor to:

train a third machine learning model from the plurality of machine learning models based on (1) a first dataset different from a second dataset used to train the first machine learning model and (2) a third dataset used to train the second machine learning model, the first dataset including a plurality of rules;

predict, via the third machine learning model, a third factor value of the plurality of factor values, based on the set of features; and the code causing the processor to enable the communication further includes code to cause the processor to enable the communication between the set of computing devices of the set of employers and the computing device of the job seeker associated with the job seeker profile based on the third factor value.

19. The method of claim 8, further comprising:

training a third machine learning model from the plurality of machine learning models based on (1) a first dataset different from a second dataset used to train the first machine learning model and (2) a third dataset used to train the second machine learning model, the first dataset including a plurality of rules;

predicting, via the third machine learning model, a third factor value of the plurality of factor values, based on the set of features; and the enabling the communication is based on the third factor value.

20. The processor-readable non-transitory medium of claim 15, wherein the code further causes the processor to:

send a communication to the computing device associated with the job seeker indicating a rejection based on the second factor value being lower than the second predetermined threshold;

automatically reactivate, after sending the communication, the job seeker profile for the job seeker in response an increase in demand for the job position; and predict, via the second machine learning model, a new second factor value based on the set of features and the increase in demand for the job position; and automatically reevaluate the job seeker profile based on the new second factor value.

* * * * *